United States Patent
Eck et al.

(10) Patent No.: US 9,367,612 B1
(45) Date of Patent: Jun. 14, 2016

(54) CORRELATION-BASED METHOD FOR REPRESENTING LONG-TIMESCALE STRUCTURE IN TIME-SERIES DATA

(75) Inventors: Douglas Eck, Palo Alto, CA (US); Jay Yagnik, Santa Clara, CA (US)

(73) Assignee: GOOGLE INC., Mountain View, CA (US)

( * ) Notice: Subject to any disclaimer, the term of this patent is extended or adjusted under 35 U.S.C. 154(b) by 871 days.

(21) Appl. No.: 13/300,057

(22) Filed: Nov. 18, 2011

(51) Int. Cl.
G06F 17/00 (2006.01)
G06F 17/30 (2006.01)

(52) U.S. Cl.
CPC ...... G06F 17/30743 (2013.01); G06F 17/3074 (2013.01)

(58) Field of Classification Search
CPC ............. G06F 17/00; G06F 17/30743; G06F 17/3074; G10L 15/02; G10L 17/02; G10L 17/06; G10L 21/00; G10L 21/10
USPC .......... 700/94; 704/243, 222, 256.8, 500–504
See application file for complete search history.

(56) References Cited

U.S. PATENT DOCUMENTS

| | | | |
|---|---|---|---|
| 5,657,424 A * | 8/1997 | Farrell et al. ................... | 704/255 |
| 5,749,072 A * | 5/1998 | Mazurkiewicz et al. ...... | 704/275 |
| 6,519,561 B1 * | 2/2003 | Farrell et al. ................... | 704/232 |
| 6,675,140 B1 * | 1/2004 | Irino et al. ...................... | 704/203 |
| 7,295,977 B2 * | 11/2007 | Whitman et al. ............. | 704/236 |
| 7,499,857 B2 * | 3/2009 | Gunawardana ............... | 704/255 |
| 8,158,870 B2 * | 4/2012 | Lyon et al. ....................... | 84/609 |
| 2001/0051871 A1 * | 12/2001 | Kroeker .......................... | 704/256 |
| 2002/0181711 A1 * | 12/2002 | Logan et al. ..................... | 381/1 |
| 2004/0230424 A1 * | 11/2004 | Gunawardana ............... | 704/219 |
| 2006/0248026 A1 * | 11/2006 | Aoyama et al. ................. | 706/12 |
| 2009/0157391 A1 * | 6/2009 | Bilobrov ..................... | 704/200.1 |
| 2009/0265159 A1 * | 10/2009 | Li et al. ............................. | 704/8 |

OTHER PUBLICATIONS

Yagnik, Jay, et al. "The Power of Comparative Reasoning", http://www.cs.utoronto.ca/~dross/YagnikStrelowRossLin_ICCV2011.pdf, 8 pages, Nov. 2011.
Lyon, Richard F., "Machine Hearing: An Emerging Field", IEEE Signal Processing Magazine, Sep. 2010.

* cited by examiner

*Primary Examiner* — Xu Mei
(74) *Attorney, Agent, or Firm* — Lowenstein Sandler LLP

(57) ABSTRACT

A system identifies a set of initial segments of a time-based data item, such as audio. The segments can be defined at regular time intervals within the time-based data item. The initial segments are short segments. The system computes a short-timescale vectorial representation for each initial segment and compares the short-timescale vectorial representation for each initial segment with other short-timescale vectorial representations of the segments in a time duration within the time-based data item (e.g., audio) immediately preceding or immediately following the initial segment. The system generates a representation of long-timescale information for the time-based data item based on a comparison of the short-timescale vectorial representations of the initial segments and the short-timescale vectorial representations of immediate segments. The representation of long-timescale information identifies an underlying repetition structure of the time-based data item, such as rhythm or phrasing in an audio item.

22 Claims, 7 Drawing Sheets

CORRELATION-BASED METHOD FOR REPRESENTING LONG-TIMESCALE STRUCTURE IN TIME-SERIES DATA

TECHNICAL FIELD

Embodiments of the present invention relate to representations of time-series data. Specifically, certain embodiments of the present invention relate to a correlation-based method for representing long-timescale structure in time-series data.

BACKGROUND

Time-series data is data measured typically at successive times spaced at uniform time intervals. Examples of time-series data can include audio data, video data, stock data, metrology data (e.g., daily rainfall, wind speed, temperature), economic data (e.g., monthly profits), sociology data (e.g., crime rate), etc. Traditionally, time-series data analysis systems are designed to extract information from a time-series data item, such as an audio item, and determine properties of the data item from the extracted information.

Many conventional data coding schemes uncover short timescale information. For example, conventional music audio coding schemes can use the extracted information to identify local pitch and timbre. However, current state of the art time-series data analysis systems still fail to uncover long-timescale information, such as rhythm and phrasing for audio.

SUMMARY

In one embodiment, a method for representing long-timescale structure in time-series data using auto-correlation is described. In one embodiment, a method comprises identifying a plurality of initial segments of a time-based data item using a time interval, computing a short-timescale vectorial representation for each initial segment, comparing the computed short-timescale vectorial representation for each initial segment with one or more short-timescale vectorial representations of segments in a duration within the time-based data item immediately preceding or immediately following the initial segment, and generating a representation of long-timescale information for the time-based data item based on a comparison of the short-timescale vectorial representations of the initial segments and the short-timescale vectorial representations of immediate segments, the representation of long-timescale information indentifying an underlying repetition structure of the time-based data item.

In addition, a system for representing long-timescale structure in time-series data using auto-correlation is described. An exemplary system may include a memory and a processor that is coupled to the memory. In one embodiment, the system computes a first feature vector for each segment in an audio item based on features extracted from the corresponding segment. Each segment is at a regular time interval in the audio item. The system computes an auto-correlation vector for each segment to represent an auto-correlation of the first feature vector of the corresponding segment with other first feature vectors at other points in time in the audio item. The system vector quantizes the auto-correlation vector for each segment using a codebook to identify a codeword in the codebook for the auto-correlation vector and generates a histogram using the codewords for the auto-correlation vectors as an audio representation of long-timescale information for the audio item.

Further, a non-transitory computer readable storage medium for representing long-timescale structure in time-series data using auto-correlation is described. An exemplary non-transitory computer readable storage medium includes instructions that will cause a processor to identify a plurality of initial segments of an audio item using a time interval, compute a short-timescale vectorial representation for each initial segment, compare the computed short-timescale vectorial representation for each initial segment with one or more short-timescale vectorial representations of segments in a duration within the time-based data item immediately preceding or immediately following the initial segment, and generate an audio representation of long-timescale information for the audio item based on a comparison of the short-timescale vectorial representations of the initial segments and the short-timescale vectorial representations of immediate segments, the audio representation of long-timescale information identifying an underlying repetition structure of the audio item.

BRIEF DESCRIPTION OF THE DRAWINGS

Various embodiments of the present invention are illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Various embodiments of the invention are directed to a method and system for representing long-timescale structure in time-series data using auto-correlation. For example, with audio, rhythm and/or phrasing of an audio item can be identified based upon local representations in the audio item that represent longer-timescales throughout the audio structure. A server computing system identifies initial segments of a time-based data item, such as audio, using a time interval. The initial segments are short segments, such as 10 milliseconds (ms) segments. The server computing system computes a short-timescale vectorial representation for each initial segment and compares the short-timescale vectorial representation for each initial segment with short-timescale vectorial representations of the segments in duration within the time-based data item that are immediately preceding and/or immediately following the initial segment.

For example, the server computing system takes each short-timescale vectorial representation and compares it to the short-timescale vectorial representations for a duration of the preceding 5 seconds and to the short-timescale vectorial representations for a duration of the following 5 seconds. The server computing system generates a representation of long-timescale information for the time-based data item based on a comparison of the short-timescale vectorial representations of the initial segments and the short-timescale vectorial representations of immediate segments to identify an underlying repetition structure of the time-based data item, such as rhythm or phrasing in an audio item.

By providing representations of long-timescale structure for time-series data items (e.g., a representation of the rhythm of a song), various embodiments of the invention greatly improve the quality of time-series based systems, such as content-based music recommendation systems, music retrieval systems, etc. Embodiments may be used for audio representation services, audio recommendation services, audio classification services, audio retrieval services, audio matching services, audio annotation services, cover song detection, etc. For example, embodiments can identify songs that have a rhythm that is similar to a particular song.

Figure 1:
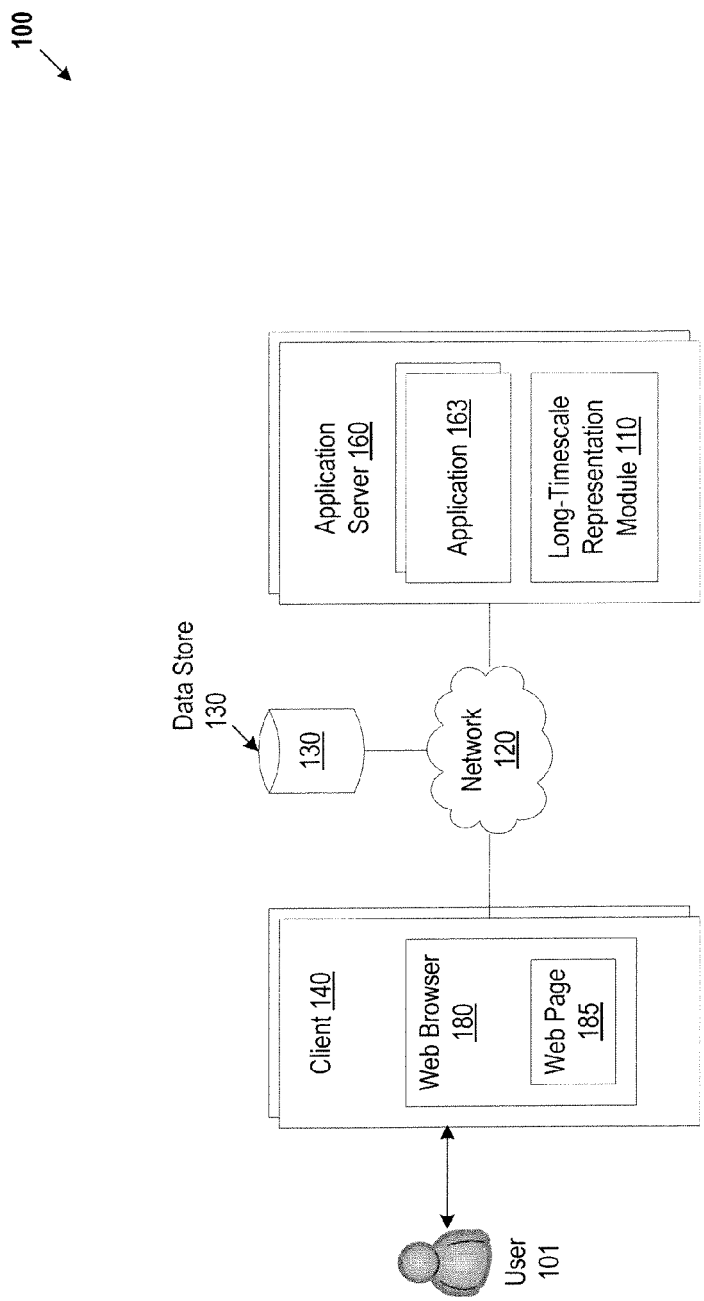
FIG. 1 is an exemplary network architecture in which various embodiments of the present invention may operate.

FIG. 1 is an exemplary network architecture 100 in which embodiments can be implemented. The network architecture 100 can include one or more application servers 160 communicating with one or more users 101 via one or more clients 140 over one or more networks 120, according to one embodiment. A network 120 can be a local area network (LAN), a wireless network, a telephone network, a mobile communications network, a wide area network (WAN), such as the Internet, or similar communication system. A client 140 can be hosted by any type of computing device including server computers, gateway computers, desktop computers, laptop computers, mobile communications devices, cell phones, smart phones, hand-held computers, tablet, or similar computing device. A client 170 can host a web browser 180, or similar application (e.g., mobile device application, tablet application), to access an application 163 via one or more web pages 185 via the network 120.

An application server 160 can host one or more applications 163 accessible by clients 140 via the network 120. An application 163 can be any type of application including, for example, a web application, a desktop application, a database management application, etc. An application 130 can manage time-series data. Examples of time-series data can include, and are not limited to, audio data, video data, stock data, metrology data (e.g., daily rainfall, wind speed, temperature), economic data (e.g., monthly profits), sociology data (e.g., crime rate), etc. For example, the application 163 can be a music application or a stock trading application. For brevity and simplicity, audio data is used as one example of time-series data throughout this document.

In one embodiment, an application server 160 is provided by and maintained within a service provider environment and provides services relating to time-series data. For example, a service provider maintains application servers 160 to provide audio services, such as audio representation services, audio recommendation services, audio classification services, audio retrieval services, audio matching services, audio annotation services, cover song detection, etc. An application server 160 can be hosted by any type of computing device including server computers, gateway computers, desktop computers, hand-held computers or similar computing device. The application server 160 can be coupled to a data store 130 that stores time-series source data. The time-series source data can include a number of time-series data items. For example, the time-series source data includes various types of audio, such as, and not limited to, music, sound bites, ring tones, voice messages, and digital audio recordings. An audio item may be a song, a music composition, a sound effect, a voice message or any other collection of sounds.

There can be more than one data store 130 storing time-series source data. In one embodiment, the one or more data stores 130 are provided by and maintained by a service provider. For example, a music service provider maintains one or more data stores 130 storing billions of tracks of audio. The data stores 130 may reside on one or more machines coupled to the application server 160 via a network. Alternatively, some or all of the data stores 130 may be hosted by the same machine that hosts application server 160. In one embodiment, the time-series source data in the data store 130 may include user generated content that is uploaded by client machines. The time-series source data may additionally or alternatively include content provided by service providers.

In one embodiment, an application server 160 includes a long-timescale representation module 110 to generate audio representations of long-timescale information for the time-series data items in the data store 130. In another embodiment, a machine that is separate from a machine hosting an application server 160 includes a long-timescale representation module 110 and communicates with one or more application servers 160 via the network 120. Examples of long-timescale information for audio can include, and are not limited to, rhythm and phrasing. Rhythm is movement or procedure with uniform or patterned recurrence of a beat, accent, or the like. In music, rhythm is the pattern of regular or irregular pulses caused in music by the occurrence of strong and weak melodic and harmonic beats, and a phrase is a division of a composition, commonly a passage of four or eight measures, forming part of a period. Phrasing is the grouping of the notes of a musical line into distinct phrases. Long-timescale information for audio, such as rhythm and phrasing, can be captured using long audio segments (e.g., 5 second audio segments) of an audio item. Examples of short-timescale information for audio can include, and are not limited to, local pitch and timbre, which can be captured using short audio segments (e.g., 10 ms second audio segments).

The long-timescale representation module 110 can use information from short audio segments of an audio item to generate the audio representation of long-timescale information for the audio item. The long-timescale representation module 110 can auto-correlate data for a short audio segment of an audio item with other short audio segments at various delay lags within the audio item to generate audio representations of long-timescale information for all of the audio items in the data store 130. The long-timescale representation module 110 can store the long-timescale representations in the data store 130.

An application server 160 can access the long-timescale representations generated by the long-timescale representation module 110 to provide a service related to time-series data, such as an audio service. For example, a user 101 may wish to access application 163 (e.g., music service application) to retrieve songs that have a rhythm that is similar to a particular song. The user 101 can send a request to identify songs with a similar rhythm to the application 163 via the browser 180. The application server 160 can use the long-timescale representation of the particular song that is stored in the data store 130 to identify songs in the data store 130 that have similar long-timescale information (e.g., rhythm, phrasing) as the particular song. The application server 160 can rank songs in the data store 130 based upon the query song using the long-timescale representation for the songs. The application server 160 can use the long-timescale representation of the query song to query the data store 130 for similar tracks based on vector distance of the vector of the query song against the vectors of the other songs.

Figure 2:
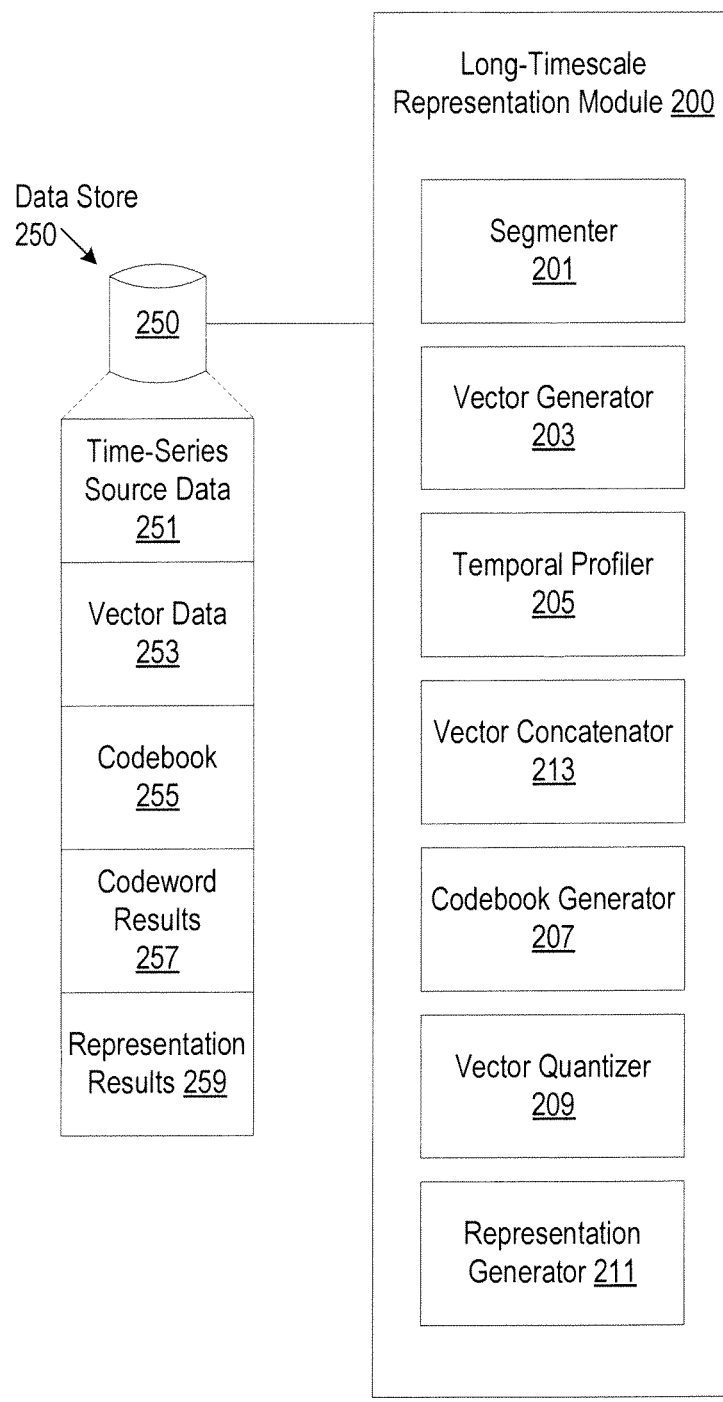
FIG. 2 is a block diagram of an embodiment of a long-timescale representation module.

FIG. 2 is a block diagram of one embodiment of a long-timescale representation module 200 for generating a representation of long-timescale information for a time-series data item. For example, the time-series data item is an audio item. The long-timescale representation module 200 may be the same as the long-timescale representation module 110 hosted by a server 160 in FIG. 1. The long-timescale representation module 200 includes a segmenter 201, vector generator 203, temporal profiler 205, vector concatenator 213, codebook generator 207, vector quantizer 209, and a representation generator 211. The components can be combined together or separated in further components, according to a particular embodiment.

The long-timescale representation module 200 can be coupled to a data store 250 that stores time-series source data 251. The time-series source data 251 can include a number of data items, such as, and not limited to, audio data items, video data items, stock data items, metrology data items, economic data items, sociology data items, etc. The time-series source data 251 can include digital audio items, such as, and not limited to, music, sound bites, ring tones, voice messages, digital audio recordings, etc. A data store 250 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

The segmenter 201 can define short segments for the data items in the data store 250 at regular time intervals t within a data item. For example, the segmenter 201 defines short audio segments for each audio item at regular time intervals t within an audio item. A short data segment (e.g., short audio segment) is also hereinafter referred to as a frame. A frame (t) is a segment of the data item at time interval t. A time interval t can be a user-defined value. In one embodiment, a time interval t is a default value, such as 10 ms. For brevity and simplicity, an audio segment is used as one example of a data segment throughout this document.

The vector generator 203 can compute a first short-timescale vectorial representation for each short audio segment of an audio item. The first short-timescale vectorial representation is also hereinafter referred to as a first feature vector or first vector. The first feature vectors can be stored as part of vector data 253 in the data store 250. Examples of a short-timescale vectorial representation of audio can include, and are not limited to, spectrograms, Mel-Frequency Cepstral Coefficients (MFCCs), Stabilized Auditory Images (SAI), and any dense vectorial representation of music audio. A first vector computed at frame (t) can be represented as $X[t]$. A first vector can be a k-dimensional vector, where k is a value based on the type of representation (e.g., SAI, MFCC). For example, the vector generator 203 generates a first feature vector $X[t]$ as having k-dimensional SAI features for every 10 ms frame in an audio item. A stabilized auditory image contains several features that can be used for sound source determinations, such as spectral separation, temporal separation, spatial separation, harmonicity and temporal regularity, intensity profile, different onsets and offsets, and common modulation.

The vector generator 203 can extract features at each frame (t) and compute the first feature vector (e.g., $X[t]$) for the corresponding frame (t). The features that are extracted at each frame (t) can depend on the type of feature set that is used by the vector generator 203. For example, the vector generator 203 can use a spectrogram feature set, MFCC feature set, or a SAI feature set to extract features at each frame (t).

The temporal profiler 205 can compute a second vectorial representation of audio at regular intervals t within an audio item. A second vectorial representation can be an auto-correlation vector, such as $Y[t]$ to represent the auto-correlation vector computed at frame (t). $Y[t]$ can store the auto-correlation between the first short-timescale vectorial representation $X[t]$ and its neighbors ranging from $X[t-j]$ to $X[t+j]$. A neighboring feature vector can include feature vectors that are immediately preceding and following a feature vector at time t within a range j. The value j can represent a range for calculating the auto-correlation. For example, j is −500 to 500 to calculate correlations from 5 seconds in the past (i.e., 500*10 ms) through 5 seconds in the future for every $X[t]$. The second vectorial representation $Y[t]$ is the long temporal descriptor for the corresponding segment. The second vectorial representation is also hereinafter referred to as a second feature vector, second vector, and a long temporal descriptor. A long temporal descriptor describes how similar the first feature vector (e.g., $X[t]$) for a particular short audio segment is to the other first feature vectors for the other short audio segments within the audio that are immediately preceding and following the particular short audio segment. One embodiment for auto-correlating the first short-timescale vectorial representation for each short audio segment is described in greater detail below in conjunction with FIG. 3 and FIG. 4.

The X vectorial representations and the Y vectorial representations for each short segment can be combined. In one embodiment, for each short segment, the vector concatenator 213 concatenates the two vectors for the short segment. In another embodiment, the long-timescale representation module 200 combines the X vectorial representations and the Y vectorial representations using an X-codebook, Y-codebook, and vector quantization. The codebook generator 207 can generate a codebook for the X vectorial representations and generate a codebook for the Y vectorial representations. A codebook as referred to herein as a finite set of vectors. Each vector in the codebook is called a code vector or a codeword. A codebook is also referred to herein as a vocabulary. A codebook for the X representations can be represented by a sparse vector of codes $V_X=[v_{x0}, v_{x1}, \ldots, v_{x\mu-1}]$, V contains μ codewords. A codeword in the X-codebook can be represented by $v_{xi}$. A codebook for the Y representations can be represented by a sparse vector of codes $W_Y=[w_{y0}, w_{y1}, \ldots w_{y\mu-1}]$, W contains μ codewords. A codeword in the Y-codebook can be represented by $w_{yi}$. In one embodiment, the codebook generator 207 generates a codebook having 1000 codewords (a 1000 word vocabulary). The codebook generator 207 can use the X representations and the Y representations for each long temporal descriptor (e.g., 10 second descriptor) of an audio item to generate the respective codebooks.

In one embodiment, the codebook generator 207 uses a sparse coding algorithm, such as a Winner-Take-All (WTA) algorithm, to build a codebook (vocabulary), such as an X-codebook and a Y-codebook. The codebook generator 207 encodes the feature vectors of the spectral representations of each frame using WTA codes to generate the codebooks (vocabularies). The WTA algorithm permutes the input feature vector, takes the first K components from the permuted vector, and outputs the index of the maximum component. The hashes corresponding to different permutations can be combined into an output hash vector. In one embodiment, the codebook generator 207 considers a set of groups of spectral dimension that is generated from random permutations. For each group, the codebook generator 207 generates a code that indentifies which spectral dimension within the group has the highest spectral value. The ensemble of these codes forms a codebook (e.g. a 10 ms-level 1000 codeword vocabulary). Embodiments of generating a codebook (vocabulary) using the WTA algorithm are described in greater detail below in conjunction with FIG. 3 and FIG. 5. The generated codebooks 255 can be stored in the data store 250. In another embodiment, the codebook generator 207 uses a k-means clustering algorithm to generate the codebooks 255.

The vector quantizer 209 can use the generated codebooks 255 to identify the closest codeword (e.g., $v_{xi}$, $w_{yi}$) in the codebook 255 for each long temporal descriptor (e.g., 10 second descriptor). The vector quantizer 209 can take an input vector (e.g., X[t], Y[t]) and evaluate the Euclidean distance between the input vector and each codeword in the codebook. When the vector quantizer 209 determines the closest codeword, the vector quantizer 209 stores the index of that codeword or the actual codeword as codeword results 257 in the data store.

The representation generator 211 can create a long-timescale representation of the audio item. In one embodiment, the representation generator 211 creates a histogram of the vocabulary of the auto-correlation vectors as the long-timescale representation of the audio item. In another embodiment, the representation generator 211 creates a histogram of the combined vectorial representations for the long temporal descriptors (e.g., 10 second descriptors) for an audio item as the long-timescale representation of the audio item. A histogram is a representation of the distribution of data. For example, in a histogram of the vocabulary of the auto-correlation vectors, each histogram codeword corresponds to a 10 second pattern (long temporal descriptor) and the histogram describes the number of times each codeword occurs in an audio item. For instance, the codeword $W_{Y3}$ for a 10 second pattern occurred 24 times in the audio item. In another example, the histogram describes the number of times each concatenated vectorial representation occurs in an audio item. In one embodiment, the histogram can be a vector. In another embodiment, the histogram is a graphical representation showing a visual impression of the distribution of data. The representation generator 211 can store the histograms in the representation results 259 in the data store 250.

Figure 3:
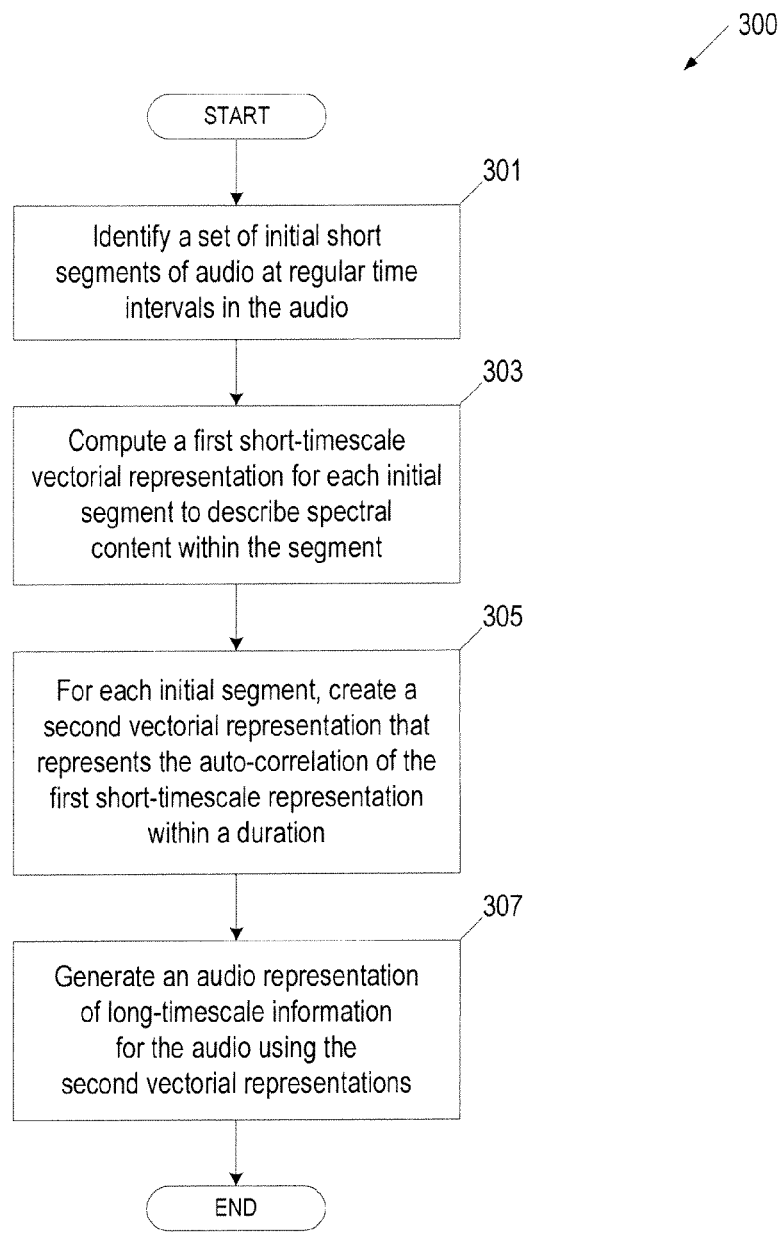
FIG. 3 is a flow diagram of an embodiment of a method for generating a data representation of long-timescale information for a time-series data item using auto-correlation.

FIG. 3 is a flow diagram of an embodiment of a method 300 for generating a data representation of long-timescale information for a time-series data item using auto-correlation. For brevity and simplicity, audio data is used as one example of time-series data in method 300. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by a long-timescale representation module 110 hosted by a server 160 in FIG. 1.

At block 301, processing logic identifies a set of initial short segments of an audio item using a time interval t. The time interval t can be 10 ms. A frame (t) is a segment of the data item at time interval t. For example, processing logic creates 10 ms segments in the audio item. At block 303, processing logic computes a short-timescale vectorial representation (first feature vector) for each initial segment to describe spectral content within that short segment. A first feature vector computed at frame (t) can be represented as X[t]. Processing logic can extract features at each initial segment to compute the first feature vector at the corresponding initial segment. In one embodiment, processing logic uses Stabilized Auditory Images (SAI) features to compute a first feature vector. Examples of SAI features can include, and are not limited to, spectral separation, temporal separation, spatial separation, harmonicity and temporal regularity, intensity profile, different onsets and offsets, and common modulation. Processing logic can use any of frequency-domain spectra, log-spectra, and compressed spectra to create the first feature vector for each segment. A first feature vector can be a k-dimensional vector, where k is based on the type of representation (e.g., SAI, MFCC).

At block 305, for each initial segment, processing logic creates a second vectorial representation (also referred to as second feature vector or auto-correlation vector), Y[t], that represents the auto-correlation of the first feature vector, X[t], based on a duration that is immediately preceding and immediately following time t. Auto-correlation of a first feature vector, X[t], is the cross-correlation of the first feature vector with itself as a function of time. The auto-correlation uncovers repeating patterns to identify long-timescale information, such as rhythm and phrasing, for audio. For example, auto-correlation of the vectors can progressively identify vectors that are similar and dissimilar to each other within an audio item, which can be used to identify a rhythm and phrasing for the audio item.

A second feature vector, Y[t], is the long temporal descriptor for the corresponding initial segment. The duration is based on a range j. For example, the second feature vector Y[t] stores the correlation between a first feature vector X[t] and the neighboring feature vectors ranging from X[t−j] to X[t+j]. A range j can be a user-defined value. In one embodiment, j is a default value, such as 500 and the duration is each 5 seconds (i.e., 500×10 ms). For example, the second feature vector Y[t] stores the correlation between X[t] and its neighbors ranging from X[t−500] to X[t+500]. Where t is 10 ms and j is 500, the computation of the second feature vector Y[t] for each initial segment becomes a long temporal descriptor spanning a longer time interval (e.g., 10 seconds) corresponding to each initial segment.

Figure 4:
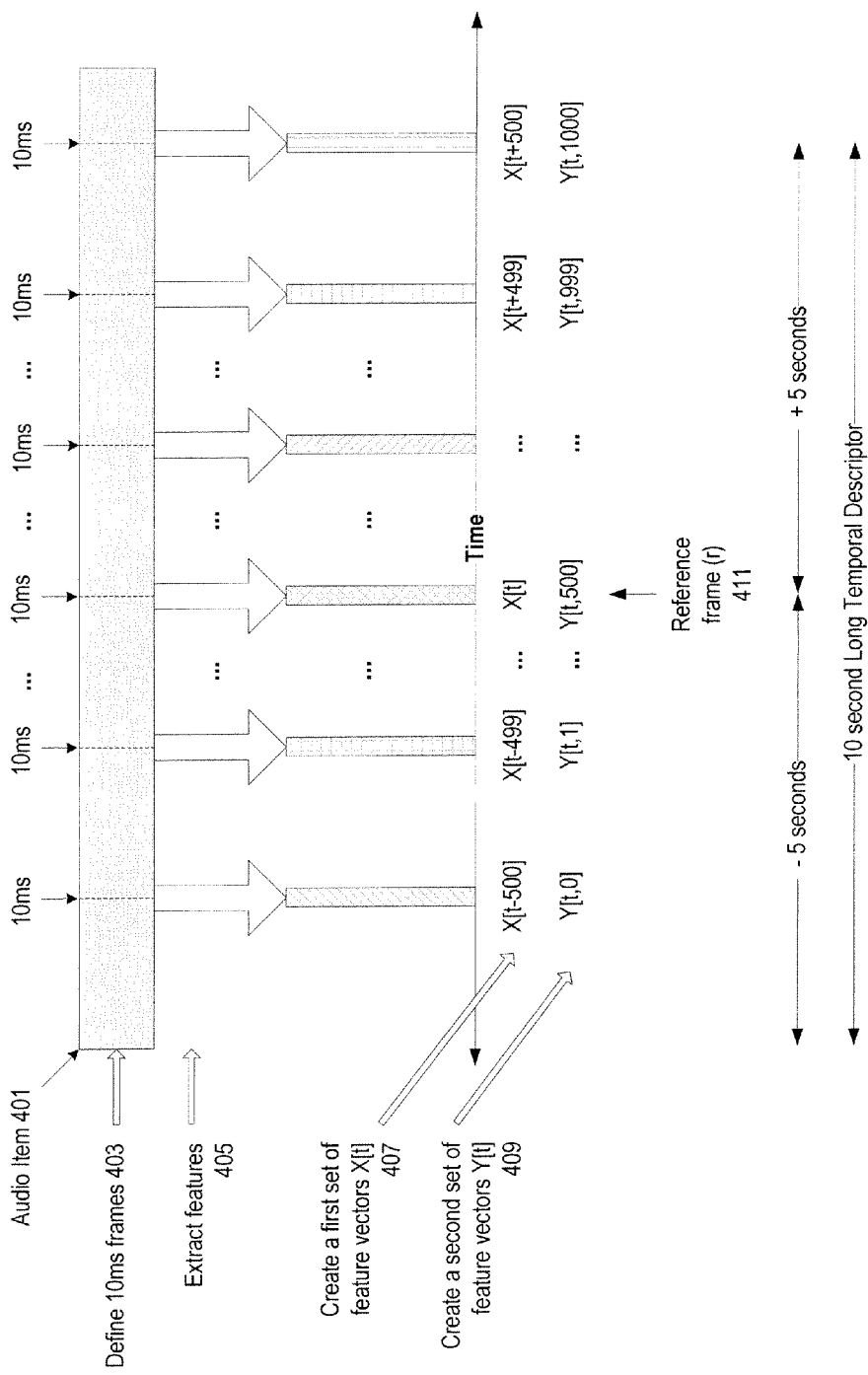
FIG. 4 is a block diagram illustrating a mechanism of generating a long temporal descriptor for a reference frame in accordance with an embodiment.

Processing logic can use a vector auto-correlation function, such as computing a dot-product of the first feature vector for a particular short segment with other first feature vectors within the audio, to compute Y[t]. FIG. 4 is a block diagram illustrating a mechanism of generating a long temporal descriptor (e.g., 10 second descriptor) for a reference frame in accordance with one embodiment. Audio 401 is segmented at regular 10 ms intervals to create multiple 10 ms frames 403. SAI features are extracted 405 for each segment. A first short-timescale vectorial representation X[t] is created 407 for each short audio segment. A reference frame(r) 409 is at time t. A second vectorial representation of audio is created 409 at regular intervals. A second vector computed at reference frame(r) 409 can be represented as Y[t]. The second vectorial representation Y[t] stores the correlation between a first feature vector X[t] for the reference frame(r) 409 and the immediate first feature vectors ranging from X[t−j] to X[t+j]. Where j is 500, the time duration preceding and following time t is each 5 seconds (i.e., 500×10 ms). Y[t] is the long temporal descriptor and Y[t,i] be the i-th value in Y[t].

Y[t,0]=the correlation (e.g., dot product) between vectors X[t] and X[t−500].

Y[t,1]=the correlation (e.g., dot product) between vectors X[t] and X[t−499].

. . .

Y[t,500]=the correlation (e.g., dot product) between vectors X[t] and X[t]
...
Y[t,1000]=the correlation (e.g., dot product) between vectors X[t] and X[t+500].

Returning to FIG. 3, at block 307, processing logic generates an audio representation of long-timescale information for the audio using the second vectorial representations. The second vectorial representations represent the comparison of the short-timescale vectorial representations of the initial segments and the short-timescale vectorial representations of immediate segments to identify an underlying repetition structure of the audio item.

Figure 5:
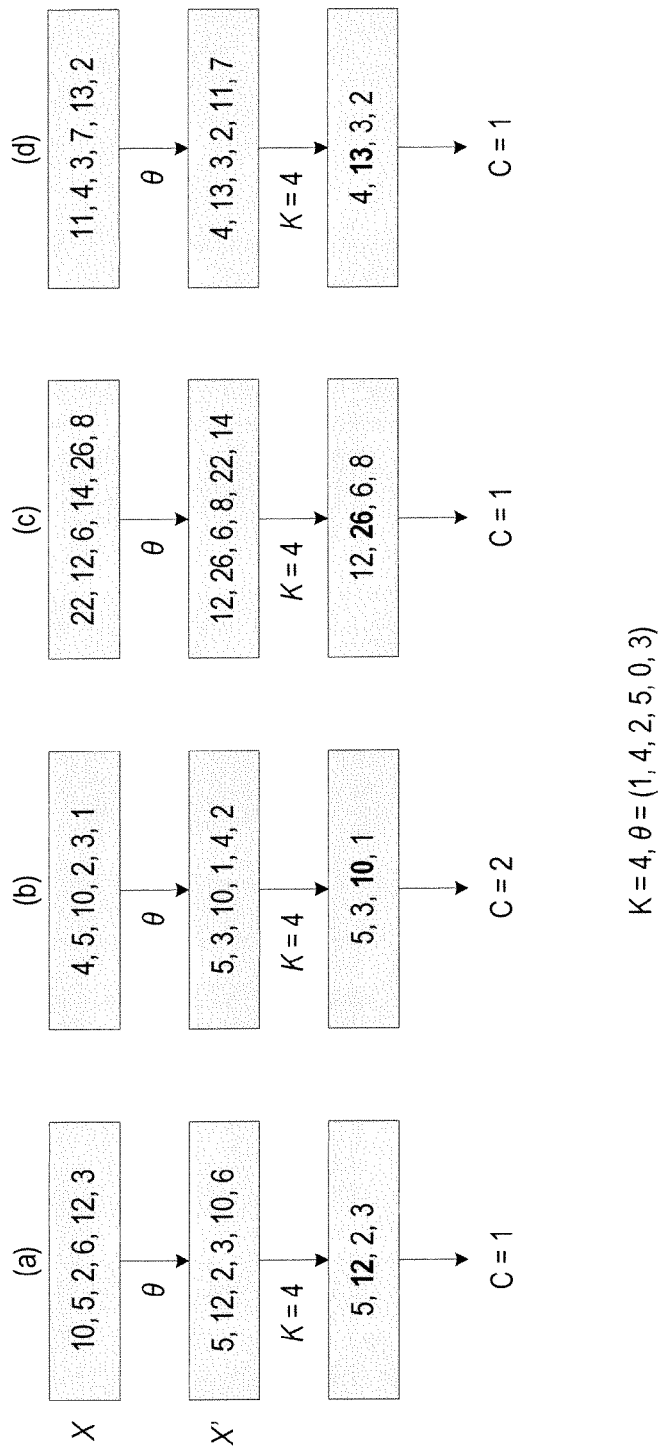
FIG. 5 is a block diagram of an exemplary application of the Winner-Take-All algorithm.

In one embodiment, processing logic generates a histogram of the vocabulary generated from the second vectorial representations (auto-correlation vectors) to represent the long-timescale structure of the audio item. In one embodiment, processing logic can generate a vocabulary (codebook) for the auto-correlation vectors using a Winner-Take-All (WTA) sparse coding algorithm. The WTA hash is a sparse embedding method that transforms the input feature space into binary codes such that Hamming distance in the resulting space closely correlates with rank similarity measures. In vector analysis, precise values of each feature dimension (e.g., values in X[t], values in Y[t]) are often not important. The WTA algorithm transforms the X and Y representations to identify which values in the representations are higher and which ones are lower to create a ranking over these values. The input for the WTA algorithm is set of $\mu$ permutations $\Theta$, window size K, input vector X. The output of the WTA algorithm is sparse vector codes $C_X$. For each permutation $\theta_i$ in $\Theta$, processing logic (a) permutes elements of X according to $\theta_i$ to get X', (b) initializes $i^{th}$ sparse code $c_{xi}$ to 0, and (c) sets $c_{xi}$ to the index of the maximum value in X' (1 . . . K). For j=0 to K−1, if X'(j)>X' ($c_{xi}$) then $c_{xi}$=1. The resulting codebook is $C_X$=[$c_{x0}$, $c_{x1}$, . . . , $c_{x\mu-1}$], C contains $\mu$ codes, each taking a value between 0 and K−1. FIG. 5 is a block diagram of an exemplary application of the WTA algorithm to four example input vectors. The input vectors (a, b, c, d) are 6-dimensional input vectors, K=4, and $\theta$=(1, 4, 2, 5, 0, 3). X in (a) and (b) are unrelated and result in different output codes, 1 and 2 respectively. X in (c) is a scaled and offset version of (a) and results in the same code as (a). X in (d) has each element perturbed by 1 which results in a different ranking of the elements, but the maximum of the first K elements is the same, again resulting in the same code.

Processing logic can generate a codebook by determining a size of the codebook. In one embodiment, the size of a codebook is 1000 codewords. Processing logic can consider a set of groups of spectral dimension that is generated from random permutations. For example, in creating the X-codebook, processing logic considers a set of groups of X[t] generated from random permutations, and in creating the Y-codebook, processing logic considers a set of groups of Y[t] generated from random permutations. For each group, processing logic generates a code that indentifies which spectral dimension within the group has the highest spectral value. The ensemble of these codes forms a codebook (e.g. a 10 ms-level 1000 codeword vocabulary codebook).

Returning to FIG. 3, at block 307, in one embodiment, processing logic generates the vocabulary for the auto-correlation vectors by vector quantizing the auto-correlation vectors for each short segment using the Y-codebook that was generated using the WTA algorithm to identify a codeword in the codebook for the auto-correlation vector. Processing logic can take an input vector (e.g., auto-correlation vector) and evaluate the Euclidean distance between the input vector and each codeword in the codebook.

In another embodiment, at block 307, processing logic creates a histogram of the combined vectorial representations for the long temporal descriptors (e.g., 10 second descriptors) for an audio item, as the long-timescale representation of the audio item the long-timescale representation of the audio item. For each initial short segment, processing logic combines the first short-timescale vectorial representation (first feature vector) and the second vectorial representation (second feature vector). In one embodiment, for each short segment, processing logic concatenates the two feature vectors for the short segment. In another embodiment, processing logic generates an X-codebook and a Y-codebook, uses vector quantization identify a codeword in a respective codebook for each feature vector for an initial short segment, and takes the cross product of the identified codewords of an initial short segment to combine the two feature vectors for the initial short segment.

Figure 6:
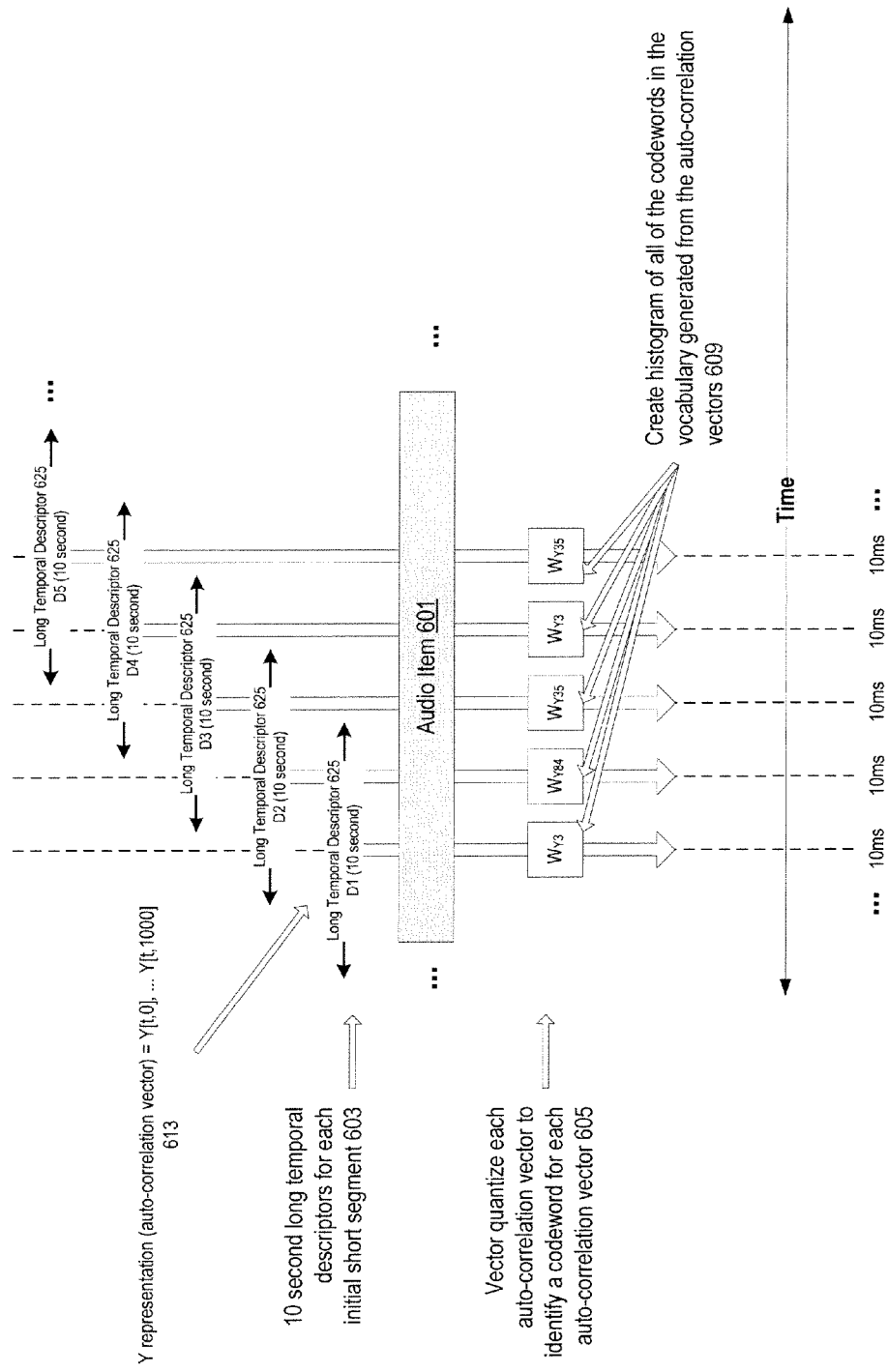
FIG. 6 is a block diagram of an embodiment for generating a long-timescale representation of the audio item using auto-correlation vectors.

FIG. 6 is a block diagram of one embodiment for generating a long-timescale representation of the audio item using auto-correlation vectors. Long temporal descriptors 625 (e.g., long temporal descriptors D1-D5) are created 603 for an audio item 601. For example, each long temporal descriptor spans 10 seconds and is created as illustrated in FIG. 4. Each long temporal descriptor 625 corresponds to an initial short segment (e.g., 10 ms short segment) and has a Y representation 613 of a feature vector. The Y representation 613 is the auto-correlation vector. The auto-correlation vector 613 for each long temporal descriptor 625 is vector quantized 605 to identify a codeword for each auto-correlation vector. The auto-correlation vectors are vector quantized, for example, using a 1000 word codebook for the Y representations generated using a Winner-Take-All algorithm. For example, for long temporal descriptor D1, the code $W_{y3}$ is the closest codeword in the Y-codebook and is assigned to Y[t]. A histogram of the codewords for the long temporal descriptors is created 609 as the long-timescale representation of the audio item 601. For example, the histograms identifies that codeword $W_{y3}$ occurred 24 times in the audio 601, codeword $W_{y84}$ occurred 8 times in the audio 601, and codeword $W_{35}$ occurred 52 times in the audio 601.

Figure 7:
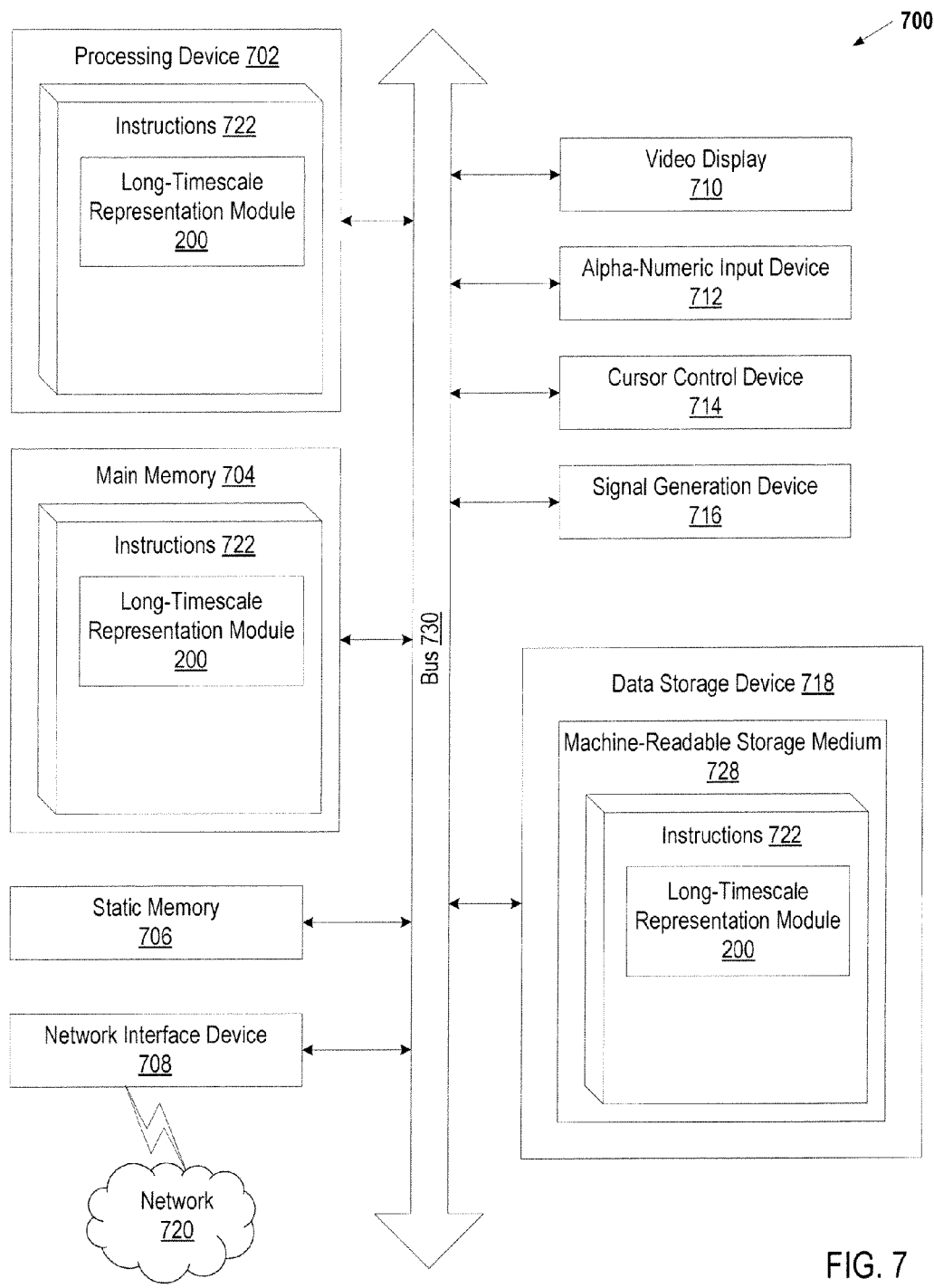
FIG. 7 is a diagram of an embodiment of a computer system for generating a data representation of long-timescale information for a time-series data item using auto-correlation.

FIG. 7 illustrates a diagram of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM), double data rate (DDR SDRAM), or DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 722 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-readable storage medium 728 (also known as a computer-readable medium) on which is stored one or more sets of instructions or software 722 embodying any one or more of the methodologies or functions described herein. The instructions 722 may also reside, completely or at least partially, within the main memory 704 and/or within the processing device 702 during execution thereof by the computer system 700, the main memory 704 and the processing device 702 also constituting machine-readable storage media.

In one embodiment, the instructions 722 include instructions for a long-timescale representation module (e.g., long-timescale representation module 200 of FIG. 2) and/or a software library containing methods that call a translation module. While the machine-readable storage medium 728 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, optical media and magnetic media.

Thus, techniques for representing long-timescale structure in time-series data using auto-correlation are described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "computing," "comparing," "generating," "creating," "vector quantizing," "responding," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

Certain embodiments of the present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

Certain embodiments of the present invention may be provided as a computer program product, or software, that may include a machine-readable medium having stored thereon instructions, which may be used to program a computer system (or other electronic devices) to perform a process according to an embodiment of the present invention. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, various embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A method comprising:
    identifying, by a processing device, a plurality of initial segments of a time-based data item using a first time interval;
    computing a short-timescale vectorial representation for each initial segment;
    for each of the plurality of initial segments, identifying a short-timescale vectorial representation corresponding to each of one or more neighboring segments that precede and follow a respective initial segment by a second time interval;
    comparing, for each of the plurality of initial segments, the computed short-timescale vectorial representation for the respective initial segment with one or more short-timescale vectorial representations of the one or more neighboring segments that precede and follow the respective initial segment by the second time interval; and
    generating a representation of long-timescale information for the time-based data item based on a comparison of the short-timescale vectorial representations of the initial segments and the short-timescale vectorial representations of neighboring segments, the representation of long-timescale information identifying an underlying repetition structure of the time-based data item.

2. The method of claim 1, wherein generating a representation of long-timescale information for the time-based data item comprises:
    creating a second vectorial representation for each initial segment, wherein the second vectorial representation is an auto-correlation vector that represents the comparison of the first short-timescale representation at time t with the first short-timescale representations ranging from the duration preceding time t and the duration following time t; and
    generating a vocabulary for the auto-correlation vectors, wherein the vocabulary comprises codewords for the auto-correlation vectors to represent long-timescale information for the time-based data item.

3. The method of claim 2, wherein the vocabulary is generated using a Winner-Take-All algorithm.

4. The method of claim 2, further comprising:
    generating a histogram of the vocabulary of the auto-correlation vectors as the representation of long-timescale information for the time-based data item.

5. The method of claim 1, wherein the time-based data item is audio.

6. The method of claim 5, further comprising:
    responding to an audio request using the audio representation of long-timescale information of the audio, wherein the audio request is at least one of a request to retrieve other audio based on the audio representation of long-timescale information of a first audio, a request to recommend other audio based on the audio representation of long-timescale information of a first audio, or a request to classify a first audio based on the audio representation of long-timescale information of the first audio.

7. The method of claim 1, wherein a short-timescale vectorial representation is at least one of a stabilized auditory image, a spectrogram, and a Mel-Frequency Cepstral Coefficient.

8. The method of claim 1, wherein the time interval is 10 milliseconds.

9. The method of claim 1, wherein the duration is 5 seconds.

10. A system comprising:
    a memory; and
    a processing device coupled with the memory, the processing device to:
    compute a first feature vector for each initial segment in an audio item based on features extracted from the corresponding segment, where each initial segment is at a regular time interval in the audio item;
    for each initial segment, identify a first feature vector corresponding to each of one or more neighboring segments that precede and follow a respective initial segment by a second time interval;
    compute an auto-correlation vector for each initial segment by comparing the first feature vector for the respective initial segment with one or more first feature vectors of the one or more neighboring segments that precede and follow the respective initial segment by the second time interval;
    vector quantize the auto-correlation vector for each initial segment using a codebook to identify a codeword in the codebook for the respective auto-correlation vector; and
    generate a histogram using the codewords for the auto-correlation vectors as an audio representation of long-timescale information for the audio item.

11. The system of claim 10, wherein the processing device is further to:
    generate a codebook for the auto-correlation vectors using a Winner-Take-All algorithm.

12. The system of claim 10, wherein the regular time interval is 10 milliseconds.

13. The system of claim 10, wherein the processing device is further to:
    respond to an audio request using the audio representation of long-timescale information of the audio, wherein the audio request is at least one of a request to retrieve other audio based on the audio representation of long-timescale information of a first audio, a request to recommend other audio based on the audio representation of long-timescale information of a first audio, or a request to classify a first audio based on the audio representation of long-timescale information of the first audio.

14. The system of claim 10, wherein the features extracted from the corresponding segment are stabilized auditory image features.

15. A non-transitory computer readable storage medium encoding instructions thereon that, in response to execution by a processing device, cause the processing device to perform operations comprising:
    identifying, by the processing device, a plurality of initial segments of an audio item using a first time interval;
    computing a short-timescale vectorial representation for each initial segment;
    for each of the plurality of initial segments, identifying a short-timescale vectorial representation corresponding to each of one or more neighboring segments that precede and follow a respective initial segment by a second time interval;
    comparing, for each of the plurality of initial segments, the computed short-timescale vectorial representation for the respective initial segment with one or more short-timescale vectorial representations of the one or more neighboring segments that precede and follow the respective initial segment by the second time interval; and
    generating an audio representation of long-timescale information for the audio item based on a comparison of the short-timescale vectorial representations of the initial segments and the short-timescale vectorial representations of neighboring segments, the audio representation of long-timescale information identifying an underlying repetition structure of the audio item.

16. The non-transitory computer readable storage medium of claim 15, wherein generating a representation of long-timescale information for the audio item comprises:
creating a second vectorial representation for each initial segment, wherein the second vectorial representation is an auto-correlation vector that represents the comparison of the first short-timescale representation at time t with the first short-timescale representations ranging from the duration preceding time t and the duration following time t; and
generating a vocabulary for the auto-correlation vectors, wherein the vocabulary comprises codewords for the auto-correlation vectors to represent long-timescale information for the time-based data item.

17. The non-transitory computer readable storage medium of claim 16, wherein the vocabulary is generated using a Winner-Take-All algorithm.

18. The non-transitory computer readable storage medium of claim 16, the operations further comprising:
generating a histogram of the vocabulary of the auto-correlation vectors as the audio representation of long-timescale information for the audio item.

19. The non-transitory computer readable storage medium of claim 15, the operations further comprising:
responding to an audio request using the audio representation of long-timescale information of the audio item, wherein the audio request is at least one of a request to retrieve other audio based on the audio representation of long-timescale information of a first audio, or a request to classify a first audio based on the audio representation of long-timescale information of the first audio.

20. The non-transitory computer readable storage medium of claim 15, wherein a short-timescale vectorial representation is at least one of a stabilized auditory image, a spectrogram, and a Mel-Frequency Cepstral Coefficient.

21. The non-transitory computer readable storage medium of claim 15, wherein the time interval is 10 milliseconds.

22. The non-transitory computer readable storage medium of claim 15, wherein the duration is 5 seconds.

* * * * *